US005942967A

United States Patent [19]
Grimes
[11] Patent Number: 5,942,967
[45] Date of Patent: Aug. 24, 1999

[54] COMPRESSOR PLUG WITH INTERNAL THERMAL OVERLOAD PROTECTION

[76] Inventor: Jarold D. Grimes, 1325 E. Virginia St., Evansville, Ind. 47711

[21] Appl. No.: 09/156,146

[22] Filed: Sep. 18, 1998

Related U.S. Application Data

[60] Provisional application No. 60/066,688, Nov. 22, 1997.

[51] Int. Cl.[6] ............................ H01H 37/04; H02H 5/04; H02P 1/26

[52] U.S. Cl. ............................ 337/380; 337/112; 361/22; 361/105; 318/778

[58] Field of Search ................................. 337/85, 87, 89, 337/97, 100–102, 112, 333, 342, 343, 377–380, 349, 56; 361/103, 105, 31, 32, 22; 318/783, 778, 767

[56] References Cited

U.S. PATENT DOCUMENTS

| | | | |
|---|---|---|---|
| 3,609,630 | 9/1971 | Francis | 339/14 P |
| 4,205,246 | 5/1980 | Wise et al. | 310/68 C |
| 4,236,092 | 11/1980 | DiFlora | 310/68 C |
| 4,387,412 | 6/1983 | Woods et al. | 361/27 |
| 4,467,385 | 8/1984 | Bandoli et al. | 361/24 |
| 4,492,866 | 1/1985 | Bar | 310/68 C |
| 4,493,144 | 1/1985 | Woods et al. | 29/622 |
| 4,646,195 | 2/1987 | Lisauskas | 361/25 |
| 5,055,726 | 10/1991 | D'Entermont et al. | 310/71 |
| 5,870,014 | 2/1999 | Nield, Jr. et al. | 337/362 |

*Primary Examiner*—Leo P. Picard
*Assistant Examiner*—Anatoly Vortman

[57] ABSTRACT

The present invention is a compressor plug with internal thermal overload protection. It simplifies and improves the installataion of, and means of conducting electricity to, a compressor such as is used as a refrigeration compressor. It comprises a housing which contains electrical connections that are molded integral to the housing. The housing further comprises a clearance that accepts a thermal overload protection device. The housing further comprises an insert that serves as a structural member reinforcing said housing. The insert can include a slot which permits mounting of said compressor plug to a top of a shell used to house a refrigeration compressor.

1 Claim, 5 Drawing Sheets

COMPRESSOR PLUG WITH INTERNAL THERMAL OVERLOAD PROTECTION

CROSS REFERENCES TO RELATED APPLICATIONS

This application claims the benefit of U.S. Provisional Application No. 60/066,688, filed Nov. 22, 1997.

STATEMENT AS TO RIGHTS TO INVENTIONS MADE UNDER FEDERALLY SPONSORED RESEARCH AND DEVELOPMENT

BACKGROUND OF THE INVENTION

1. Field of the Invention

This invention relates to electrical connections to compressors such as, but not restricted to, refrigeration compressors such as are used with refrigerators and air conditioners.

2. Background Information

Currently electrical connections for refrigeration compressors are assembled from a number of components and then connected to the top of a metal shell containing the refrigeration compressor. Skilled assembly labor is required for mass production and there is always a chance for error. Having large quantities of individual pieces requiring assembly is inconvenient, time consuming, and requires time and attention in the manufacture, procurement, handling and storage of the various pieces. It is an exercise in configuration control. As will be seen in the subsequent description, the present invention, a compressor plug with internal thermal overload protection overcomes these and other deficiencies in existing approaches and methods of electrical connections to a refrigeration compressor.

SUMMARY OF THE INVENTION

The present invention, a compressor plug with internal thermal overload protection, simplifies and improves the installation of the means of conducting electricity to a compressor such as is used as a refrigeration compressor. It features a housing which contains electrical connections that are molded integral to the housing. The housing has a clearance that accepts a thermal overload protection device that is common to the heating, ventilating, air conditioning and refrigeration trades. The housing includes an insert that serves as a structural member reinforcing said housing. The insert includes a slot which permits mounting of said compressor plug to a cover used to house refrigeration compressors.

DESCRIPTION OF THE PREFERRED EMBODIMENTS

The present invention is a device for electrically connecting a source of electrically to a compressor.

Figure 1:
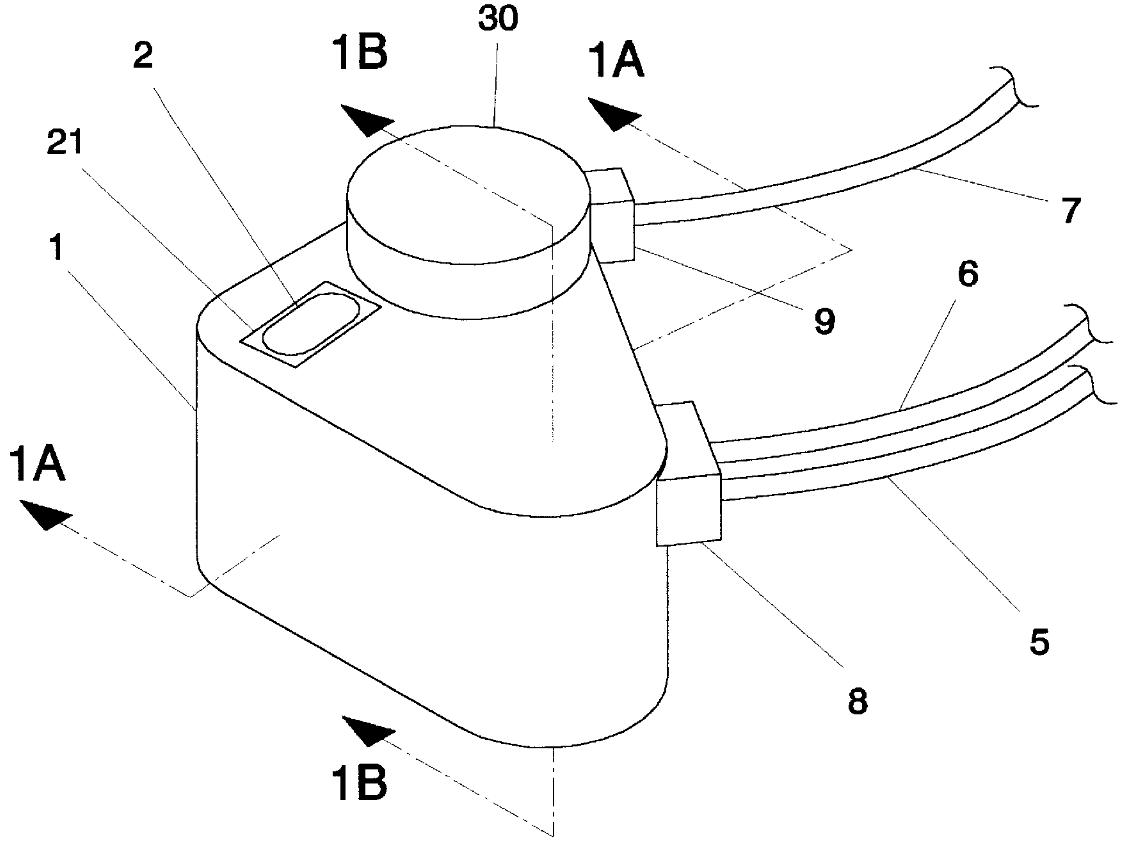
FIG. 1 is a view of the preferred embodiment of the present invention.
Figure 1A:
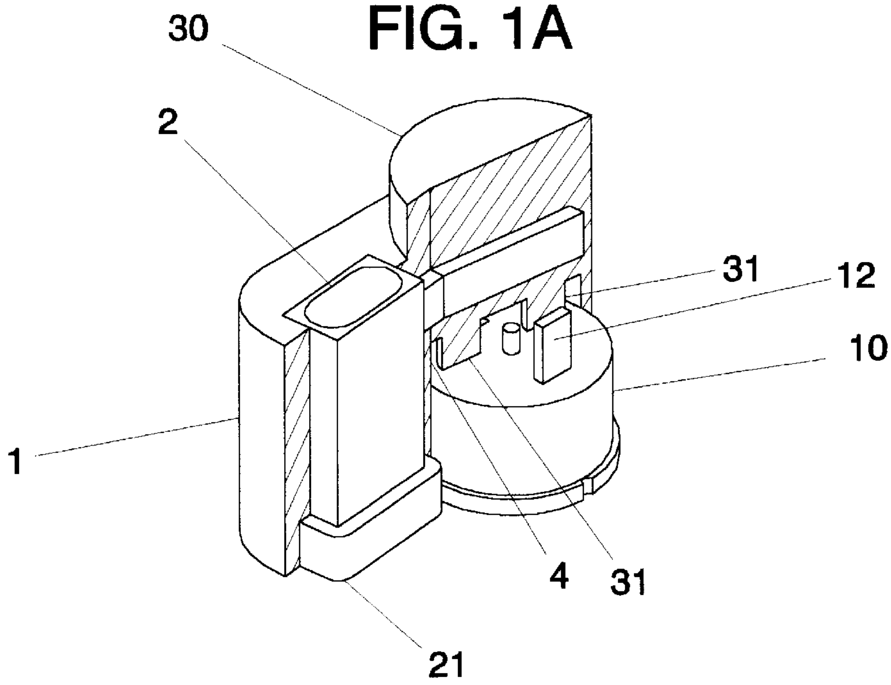
FIG. 1A is a cross-section from FIG. 1 illustrating a structural insert and a thermal overload protection insert.
Figure 1B:
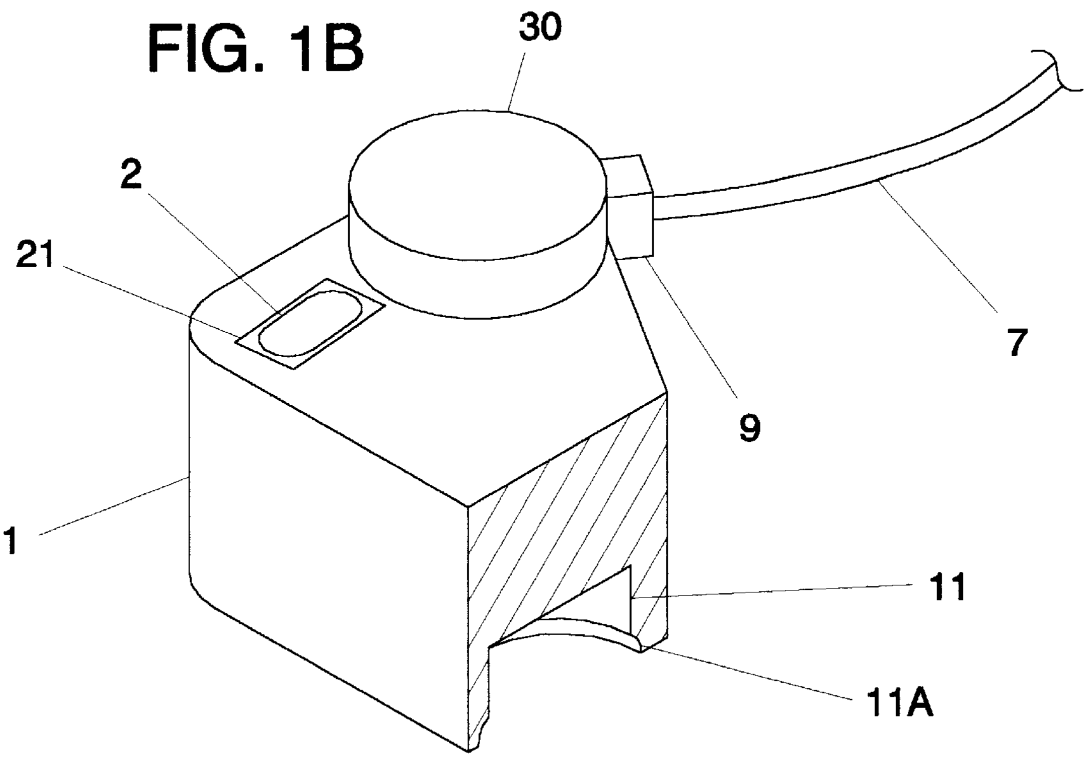
FIG. 1B is another cross-section view from FIG. 1.

Referring to FIGS. 1, 1A, and 1B, the preferred embodiment of the present invention, a compressor plug with internal thermal overload protection 1 includes a body 30, an insert 21 with a slot 2, a cavity 4, an S wire 5, an R wire 6, an overload wire 7, a wire projection 8, an overload wire projection 9, a thermal overload protector 10, a FUSITE recess 11, a chamfer 11A, a common wire 20, and projections 31. The thermal overload protector 10 includes overload connections 12.

The thermal overload protector 10 is known to the trade as a KLIXON, which is commercially available from Texas Instruments, Inc., Motor Controls, 343 Forest Street, MS 1-34, Attleboro, Mass.

In the preferred embodiment of the present invention, the body 30 would be injection molded from a vinyl compound, such as NORAPLAS 18750 which is available from North American Plastics, Inc., P.O. Box 845, Aberdeen, Miss. 39730, Ph. (601) 369-9586. However, as obvious to anyone skilled in the art, other plastic or rubber compounds would serve the intended purpose. An example of an alternate material is the SANTOPRENE thermoplastic rubber compound manufactured by the Monsanto Corporation. Also, as obvious to anyone skilled in the art, other manufacturing methods including compression molding of a rubber compound would serve the same purpose.

Figure 2:
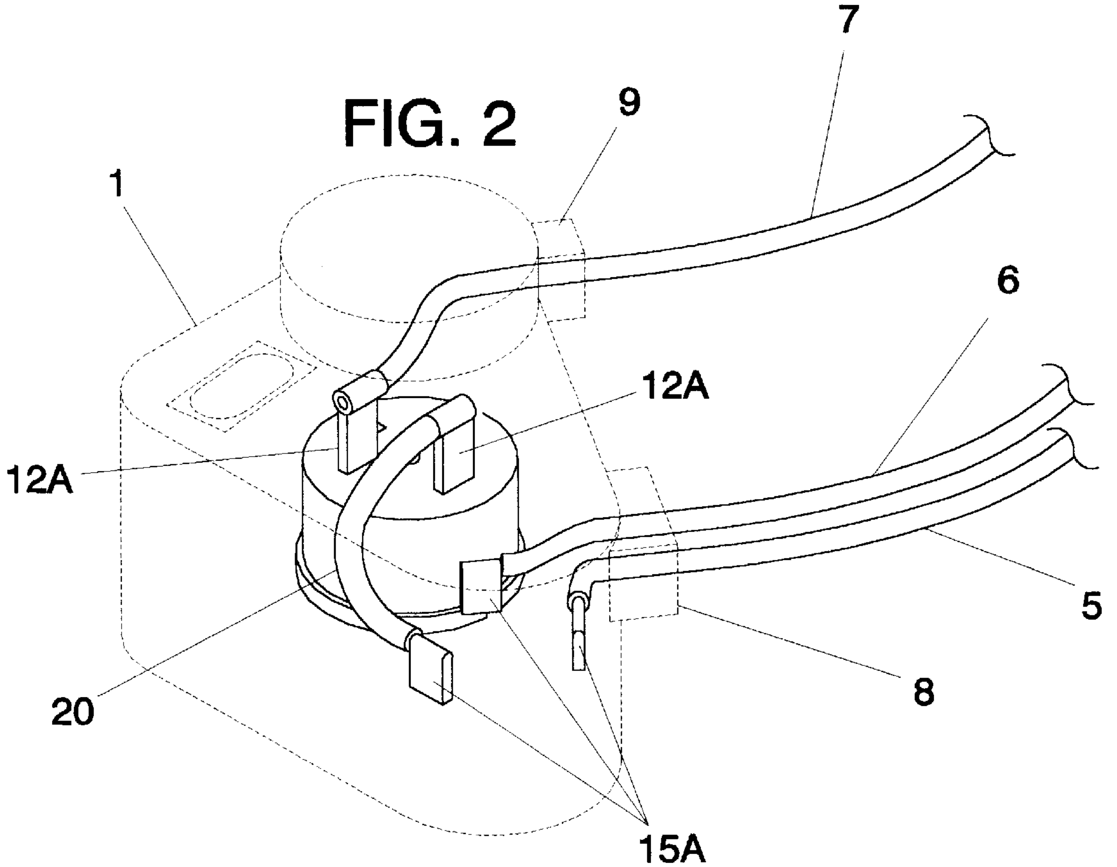
FIG. 2 illustrates electrical connections within the present invention.
Figure 3:
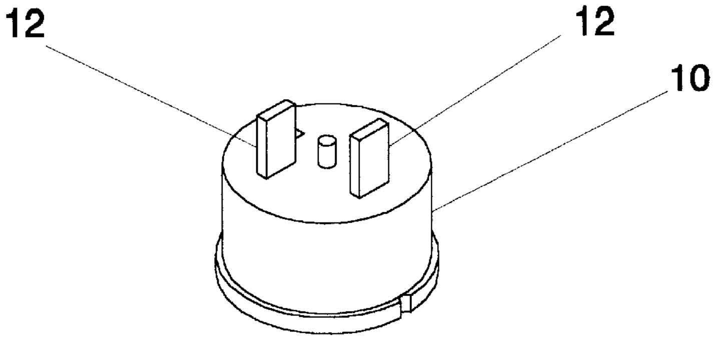
FIG. 3 is a view of the thermal overload protection.
Figure 5:
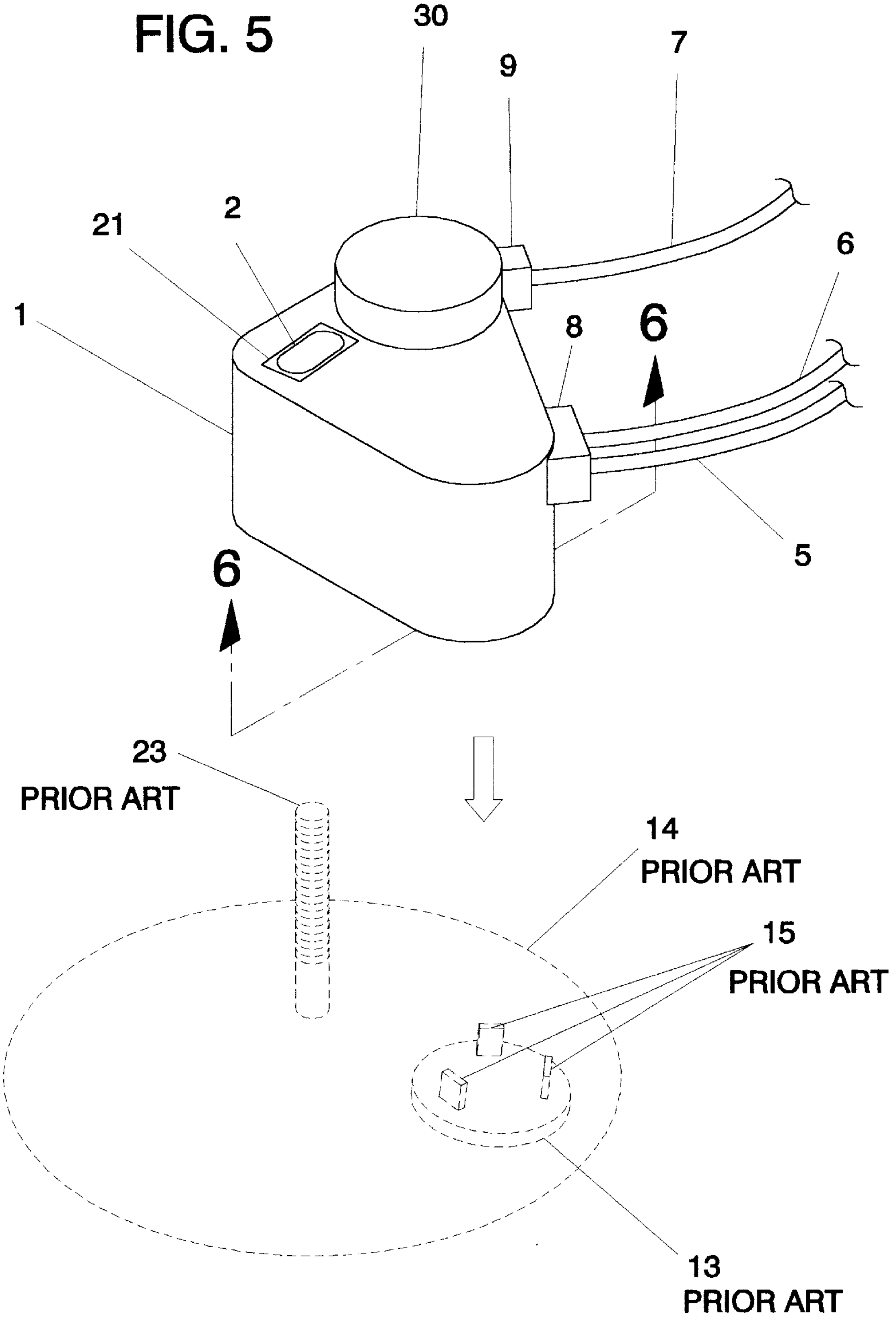
FIG. 5 illustrates how the present invention is installed.

As shown in FIG. 2, the body 30, is molded around the S wire 5, the R wire 6, the overload wire 7, and the common wire 20. The overload wire 7 has a female overload protector electrical connector 12A that connects to one of the thermal overload connectors 12 (Ref. FIG. 3) of the thermal overload protector 10. The common wire 20 also has a female overload protector electrical connector 12A which connects to one of the thermal overload connectors 12. The common wire 20 leads to an electrical connector 15A, which is a female connector, which will be connected to male connector 15 of a FUSITE 13 (Ref. FIG. 5) which is an electrical connection or coupler that is part of the prior art. FIGS. 2 and 3 illustrate a normally closed thermal overload protector 10. The thermal overload protector 10 is also available as a normally open thermal overload protector 10 which differs in that one of the thermal overload connectors 12 is in an alternate location. For use of a normally open thermal overload protector 10, the location of the corresponding female overload protector electrical connector 12A is altered within the body 30 so that the female overload protector electrical connector 12A is in the proper location with respect to the appropriate thermal overload connector 12 of the normally open thermal overload protector 10. The female overload protector electrical connectors 12A are molded in position in the body 30 as required to accept the thermal overload connectors 12 of the overload protectors 10 when the thermal overload protector 10 is inserted into the cavity 4 of the body 30.

The plug in wiring connections 15A are located within the body 30 as required to accept male connectors 15 of a FUSITE 13.

Figure 4:
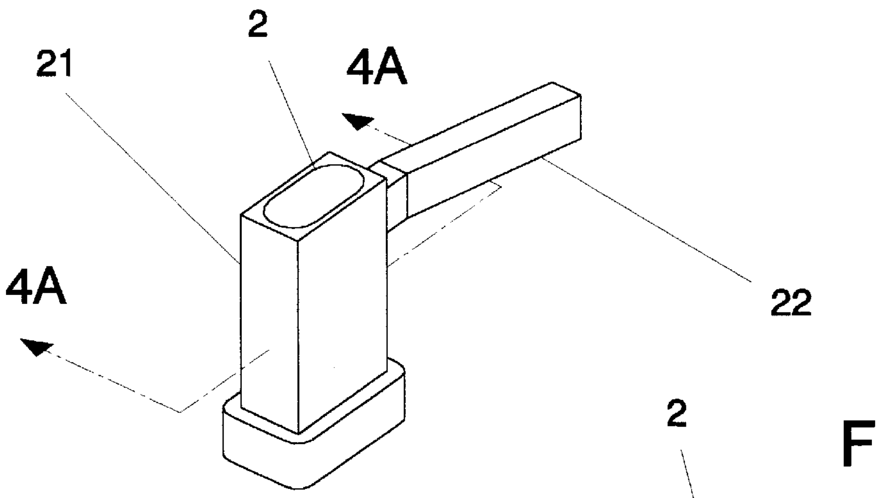
FIG. 4 is a view of a structural reinforcement.
Figure 4A:
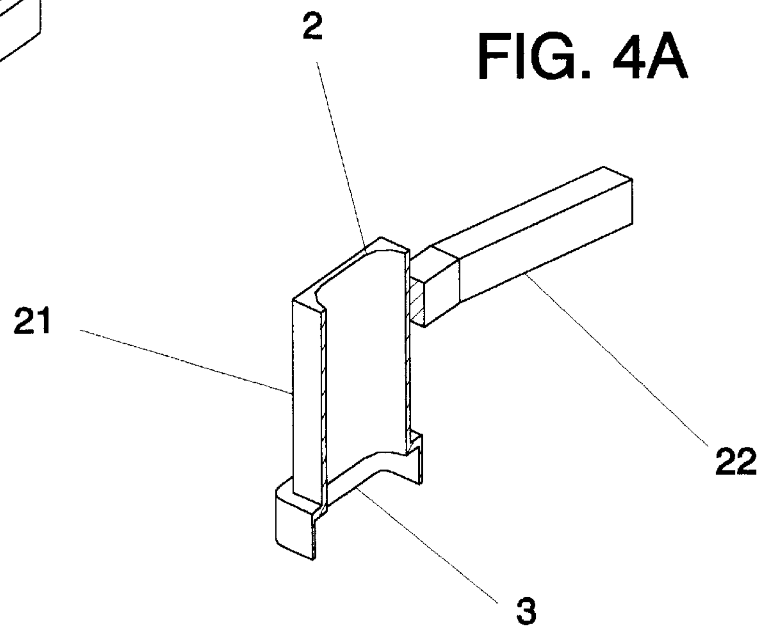
FIG. 4A is a cross-section view of the structural reinforcement shown in FIG. 4.

Referring to FIGS. 4 and 4A, the insert 21 with the slot 2 further comprises an arm 22 and a collar 3. The insert 21 structurally reinforces the body 30, especially in the regions of the body 31 that are between the insert 21 and the thermal overload protector 10 as shown in FIG. 1A. Also shown in FIG. 1A is how the arm 22 cantilevers over the projections 31 which abutt the thermal overload protector 10. The collar 3 serves as a stiffener to the insert 21.

In the preferred embodiment of the present invention, the insert 21 is a molded nylon insert. However, as obvious to anyone skilled in the art, a variety of other materials would serve the same purpose.

The prior art FUSITE 13 is a part of a refrigeration compressor structure with the male connectors 15 that match the above mentioned plug in electrical connectors 15A, which are female connections, that are located within the body 30 as required to accept the male connectors 15 of the FUSITE 13. The FUSITE 13 is a common part known to the refrigeration compressor trade. It is not a part of the present invention. The FUSITE 13 is electrically connected to an electric motor driving the refrigeration compressor. The Fusite 13 is used as a specific example of a typical electrical connection or coupler used in wiring circuits between sets of wires to serve as a mechanical connection between said sets of wires.

Prior to the present invention, there were many exposed electrical connections that had to be hand wired and then extra parts added to protect and shield said exposed connections. As can be seen from the prints, the present invention electrically connects and shields a source of electricity to a compressor, such as a refrigeration compressor, with a minimum of parts and hand labor. Many times a refrigeration compressor is contained within a metal shell which has only the male connectors of the FUSITE 13 and, sometimes, a male stud extending from the top of the shell. As shown in FIG. 5, the slot 2 permits the preferred embodiment of the present invention, the compressor plug with internal thermal overload protection 1 to be inserted around such a male stud 23 extending from the top 14 of a shell containing a refrigeration compressor. In such an instance, a nut or a nut with a washer secured to a threaded end on said male stud would hold the compressor plug with internal thermal overload protection 1 to the aforementioned top 14. The slot 2 is elongated so as to permit some swiveling in position to allow for variations in tolerances encountered in the refrigeration compressor assemblies. In instances where there is no male stud for attachment of the invention, the slot 2 would not be required. Hence, the slot 2 is an option available as required for the preferred embodiment of the present invention.

The FUSITE recess 11 and the chamfer 11A (Ref. FIG. 1B) accepts the FUSITE 13 within the body 30.

Figure 6:
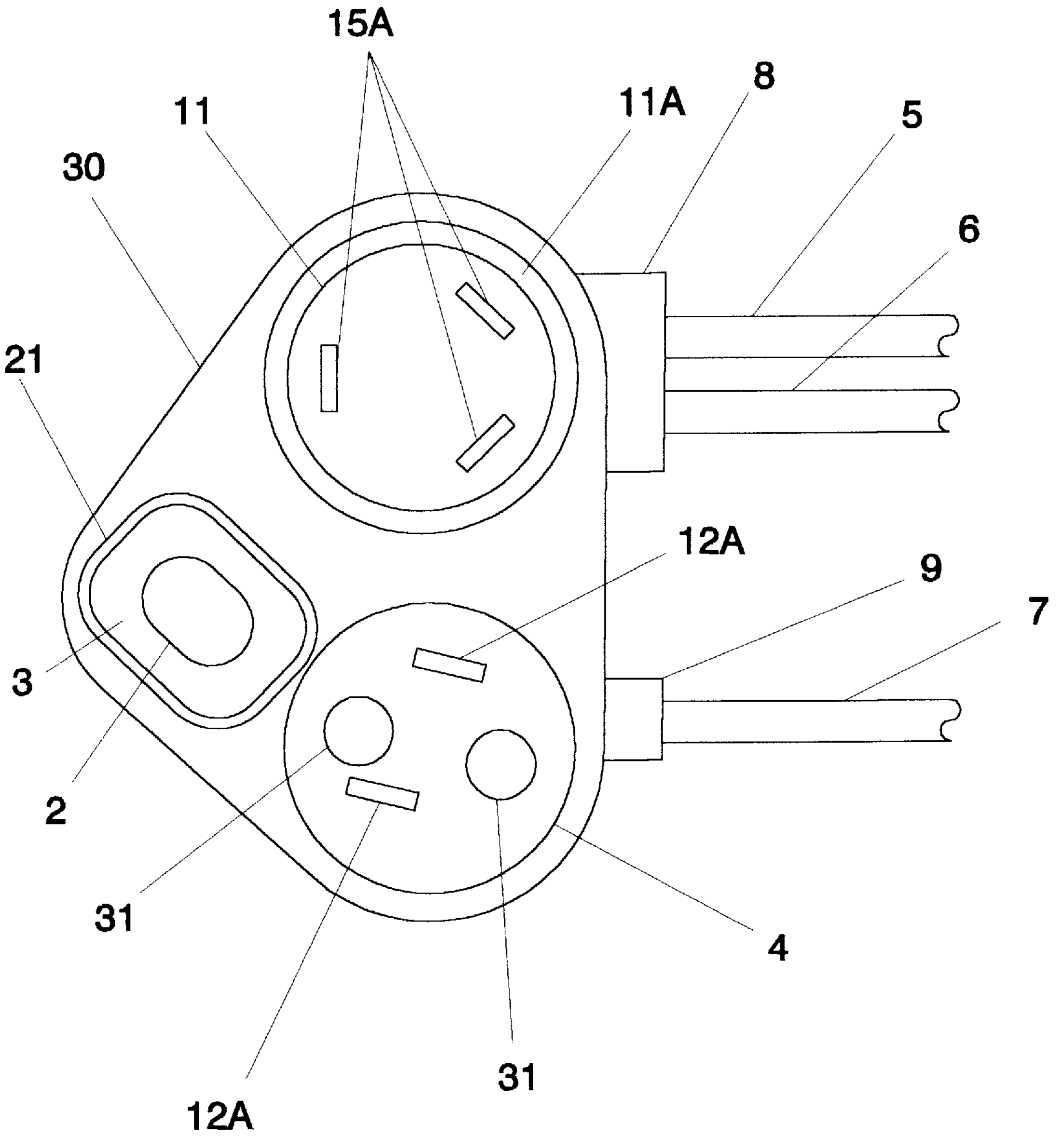
FIG. 6 is a bottom view from FIG. 5.

FIG. 6 is a bottom view of the of the compressor plug with internal overload protection 1 without the thermal overload protecter 10, to clarify details mentioned in the above description.

Although the description above contains many specificities, these should not be construed as limiting the scope of the invention but as merely providing illustrations of some of the presently preferred embodiments of this invention. Thus the scope of the invention should be determined by the appended claims and their legal equivalents, rather than by the examples given.

I claim:

1. A device electrically connecting a source of electricity to a compressor comprising:

a body with a cavity, said cavity accepting a thermal overload protector, projections positioned within said body and facing said cavity, an electrical wiring molded within said body, internal electrical connectors connecting to said thermal overload protector, an insert which structurally reinforces the body of said device, said insert comprising an arm, a slot and a reinforcing collar, wherein said projections abutting said thermal overload protector and said arm cantilevering over said projections when said device is mounted on a male stud.

* * * * *